US010059198B2

(12) United States Patent
Sperando et al.

(10) Patent No.: US 10,059,198 B2
(45) Date of Patent: Aug. 28, 2018

(54) IMPROPER FUEL NOZZLE INSERTION-INHIBITING ASSEMBLY (71) Applicant: ILLINOIS TOOL WORKS INC., Glenview, IL (US)

(72) Inventors: Stephen Sperando, Glen Ellyn, IL (US); Christian Beck, Rottingen (DE); Paul Sutenbach, Highland Park, IL (US)

(73) Assignee: Illinois Tool Works Inc., Glenview, IL (US)

(*) Notice: Subject to any disclaimer, the term of this patent is extended or adjusted under 35 U.S.C. 154(b) by 43 days.

(21) Appl. No.: 15/103,912

(22) PCT Filed: Oct. 23, 2014

(86) PCT No.: PCT/US2014/062038
§ 371 (c)(1),
(2) Date: Jun. 13, 2016

(87) PCT Pub. No.: WO2015/094478
PCT Pub. Date: Jun. 25, 2015

(65) Prior Publication Data
US 2016/0318389 A1  Nov. 3, 2016

Related U.S. Application Data (60) Provisional application No. 61/918,308, filed on Dec. 19, 2013.

(51) Int. Cl.
*B60K 15/04* (2006.01)
*B60K 15/05* (2006.01)
*B60K 15/03* (2006.01)

(52) U.S. Cl.
CPC .............. *B60K 15/04* (2013.01); *B60K 15/05* (2013.01); *B60K 2015/03236* (2013.01);
(Continued)

(58) Field of Classification Search
CPC .. B60K 15/04; B60K 15/05; B60K 2015/053; B60K 2015/03296; B60K 2015/03236; B60K 2015/0483; B60K 2015/0461
(Continued)

(56) References Cited

U.S. PATENT DOCUMENTS 5,282,497 A * 2/1994 Allison ............ B60K 15/03504
137/588
5,503,199 A * 4/1996 Whitley, II ............ B60K 15/04
141/286

(Continued)

FOREIGN PATENT DOCUMENTS

FR        2753138 A1    3/1998
WO    2005077698 A1    8/2005
(Continued)

OTHER PUBLICATIONS

ISR and WO for PCT/US2014/062038 dated Mar. 17, 2015.

*Primary Examiner* — Nicolas A Arnett
(74) *Attorney, Agent, or Firm* — Joseph M. Butscher; The Small Patent Law Group, LLC (57) ABSTRACT

An improper fuel nozzle insertion-inhibiting assembly may include a cover having a nozzle inlet barrier door pivotally secured to the cover. The cover may include a safety-release groove that is configured to separate the cover into separate pieces upon exertion of sufficient force. A main body is secured to the cover and configured to connect to a fuel fill pipe. The main body may include a nozzle outlet barrier door pivotally secured to the main body. A debris filter may be secured to one or both of the cover and/or the main body. The debris filter is configured to prevent debris from passing into an internal chamber. A pivot-restricting member(s) may be secured within the internal chamber. The pivot-restricting member(s) is configured to prevent one or both of the nozzle inlet barrier door and the nozzle outlet barrier door from
(Continued)

over-pivoting. At least one seal member may be configured to sealingly engage at least portions of the fuel fill pipe, the cover, and the main body.

20 Claims, 7 Drawing Sheets

(52) U.S. Cl.
CPC ............... *B60K 2015/03296* (2013.01); *B60K 2015/0461* (2013.01); *B60K 2015/0483* (2013.01); *B60K 2015/053* (2013.01)

(58) Field of Classification Search
USPC .................. 141/348–350; 220/86.1–86.2
See application file for complete search history.

(56) References Cited

U.S. PATENT DOCUMENTS

| | | | |
|---|---|---|---|
| 5,507,324 A * | 4/1996 | Whitley, II | B60K 15/04 141/286 |
| 6,446,826 B1 * | 9/2002 | Foltz | B60K 15/04 220/203.01 |
| 7,077,178 B2 * | 7/2006 | Hedevang | B60K 15/04 141/301 |
| 7,299,821 B2 * | 11/2007 | Briggs | B60K 15/077 123/511 |
| 7,302,977 B2 * | 12/2007 | King | B60K 15/04 141/302 |
| 7,549,443 B2 | 6/2009 | Levey et al. | |
| 7,950,425 B2 | 5/2011 | Och | |
| 7,967,042 B2 * | 6/2011 | Groom | B60K 15/04 141/350 |
| 9,102,230 B2 | 8/2015 | Hagano et al. | |
| 9,415,679 B2 * | 8/2016 | Frank | B60K 15/03006 |
| 9,649,930 B2 * | 5/2017 | Kato | B60K 15/04 |
| 2005/0121085 A1 | 6/2005 | Levey et al. | |
| 2011/0079322 A1 | 4/2011 | Beier et al. | |
| 2011/0108563 A1 | 5/2011 | Gerdes | |
| 2011/0132906 A1 | 6/2011 | Miller et al. | |
| 2012/0217240 A1 | 8/2012 | Dutzi et al. | |
| 2013/0075399 A1 | 3/2013 | Hagano | |
| 2015/0251532 A1 * | 9/2015 | Kato | B60K 15/04 220/86.2 |
| 2016/0009173 A1 | 1/2016 | Sperando et al. | |

FOREIGN PATENT DOCUMENTS

| | | |
|---|---|---|
| WO | 2010021829 A1 | 2/2010 |
| WO | 2011053563 A1 | 5/2011 |
| WO | 2014133813 A1 | 9/2014 |

* cited by examiner

IMPROPER FUEL NOZZLE INSERTION-INHIBITING ASSEMBLY

RELATED APPLICATIONS

This application is a National Phase of International Application No. PCT/US2014/062038, filed Oct. 23, 2014, and relates to and claims priority benefits from U.S. Provisional Patent Application No. 61/918,308, filed Dec. 19, 2013, which is hereby incorporated by reference in its entirety.

FIELD OF EMBODIMENTS OF THE DISCLOSURE

Embodiments of the present disclosure generally relate to fuel nozzle receiving systems of vehicles, and more particularly, to fuel nozzle receiving systems that are configured to inhibit improper or incompatible fuel nozzles from dispensing fuel into a fuel tank.

BACKGROUND

Various vehicles, such as automobiles, are powered by gasoline, diesel fuel, or the like. As such, the vehicles typically include fuel systems having a tank configured to retain fuel, such as gasoline or diesel fuel, and a fuel fill pipe that serves as an inlet for supplying fuel to the tank from a fuel nozzle of a refueling station. In general, a fuel fill pipe includes an opening that may be exposed during refueling to receive the nozzle. An exposed end portion of the fuel pipe is of sufficient size to receive a discharge tube of a refueling nozzle. The nozzle typically fits relatively loosely in the fuel fill pipe so that the nozzle may be quickly and easily inserted and removed from the fuel fill pipe.

Many passenger and commercial vehicles are powered through diesel fuel. The automotive industry continues to produce diesel powered vehicles at an increasing rate. Refueling stations provide diesel fuel for customers. Indeed, in Europe, nearly 50% of all passenger vehicles are powered by diesel fuel.

However, many diesel powered vehicles are susceptible to being mis-fueled (for example, mistakenly fueled) with gasoline. Gasoline nozzles typically are smaller than diesel nozzles and may be inserted into a refueling orifice of a diesel powered vehicle. Conversely, the larger size of a diesel nozzle typically prevents it from being inserted into the smaller refueling orifice of a gasoline powered vehicle.

Accordingly, various fuel systems include a mis-fuel inhibitor (MFI). An MFI is a device configured to prevent a gasoline nozzle from being inserted into a diesel fuel tank, or vice versa. For example, one type of MFI includes an inlet having an opening that prevents mis-fueling by nozzles having a diameter that exceeds that of the opening. As an example, the MFI may include top and bottom doors. While an improper nozzle may be inserted past the top door, the nozzle generally is unable to engage the bottom door as the diameter of the nozzle is too large to pass through a passage proximate to the bottom door. Another type of MFI includes a locking bottom door that only allows a complimentary nozzle to fit therethrough. Additional MFI systems are disclosed in WO 2005/077698, WO 2010/021829, WO 2011/053563, U.S. Pat. No. 7,950,425, U.S. Pat. No. 7,549,443, and FR 2 753 138, for example.

As fuel efficiency standards are promulgated, many manufacturers seek to minimize sizes and weights of certain components of vehicles, in order to reduce the overall weight of the vehicle. Also, additional components may be secured within spaces of vehicles, such as vehicle frames. MFIs mounted within a nozzle-receiving assembly are also becoming smaller. Smaller MFIs are needed that will accommodate larger nozzles in reduced volumes and spaces within the vehicles.

SUMMARY OF EMBODIMENTS OF THE DISCLOSURE

Certain embodiments of the present disclosure provide an improper fuel nozzle insertion-inhibiting assembly configured to prevent an improper fuel-dispensing device from dispensing fuel into a fuel fill line of a vehicle. The improper fuel nozzle insertion-inhibiting assembly may include a cover including a nozzle inlet barrier door pivotally secured to the cover. The cover may include a safety-release groove that is configured to separate the cover into separate pieces upon exertion of sufficient force. In at least one embodiment, the safety-release groove extends around a circumference of an outer surface of the cover.

A main body may be secured to the cover and configured to connect to a fuel fill pipe. The main body may include a nozzle outlet barrier door pivotally secured to the main body. At least a first portion of the main body may securely connect to at least a second portion the cover. In at least one embodiment, the first portion of the main body may include an outwardly-extending annular connector, and the second portion of the cover may include a circumferential groove formed on an inner wall. The circumferential groove snapably retains the annular connector.

The cover may be configured to securely connect to the fuel fill pipe and at least one other fuel fill pipe formed of a different material and having a different shape than the fuel fill pipe. For example, the cover may be configured to securely connect to a metal fuel fill pipe having a first size and first shape, and the same cover may be configured to securely connect to a plastic fuel pipe having a second size and second shape that differ from the first size and first shape, respectively.

A debris filter may be secured to one or both of the cover and the main body. The debris filter may be configured to prevent debris from passing into an internal chamber defined by one or both of the cover and the main body. In at least one embodiment, the debris filter may define a tortuous path that is configured to allow pressurized fluid within the internal chamber to pass out of the internal chamber. The tortuous path is configured to prevent debris from passing into the internal chamber.

At least one pivot-restricting member may be secured within the internal chamber. The pivot-restricting member(s) may be configured to prevent one or both of the nozzle inlet barrier door and the nozzle outlet barrier door from over-pivoting. In at least one embodiment, the pivot-restricting member(s) may include one or more of a stud, latch, beam, block, or rib extending into the internal chamber At least one seal member may be configured to sealingly engage at least portions of the fuel fill pipe, the cover, and the main body. For example, a single seal member, such as a pipe seal, may be configured to sealingly engage portions of each of the fuel fill pipe, the cover, and the main body.

Certain embodiments of the present disclosure provide an improper fuel nozzle insertion-inhibiting assembly that may include a cover including a nozzle inlet barrier door pivotally secured to the cover. The cover includes a safety-release groove that is configured to separate the cover into separate pieces upon exertion of sufficient force. A main body is secured to the cover and configured to connect to a fuel fill pipe. The main body includes a nozzle outlet barrier door pivotally secured to the main body.

Certain embodiments of the present disclosure provide an improper fuel nozzle insertion-inhibiting assembly that may include a cover, a main body secured to the cover and configured to connect to a fuel fill pipe, and a debris filter secured to one or both of the cover and the main body. The debris filter is configured to prevent debris from passing into an internal chamber defined by one or both of the cover and the main body.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide an improper fuel nozzle insertion-inhibiting assembly, or MFI assembly, that may include one or more nozzle barrier doors. In at least one embodiment, the MFI assembly may include one or more pivot-restricting members that are configured to provide positive stops that prevent the one or more nozzle barrier doors from being over-pivoted. Accordingly, the pivot-restricting members prevent the nozzle barrier door(s) from pivoting past a point in which they would otherwise fall out of pivotal engagement with the MFI assembly.

In at least one embodiment, an MFI assembly may include a cover that securely and robustly connects to a nozzle guide, such as through snapable engagement. For example, the nozzle guide may include a connector, such an annular ridge, which snapably secures to a reciprocal groove formed in the cover. Alternatively, the nozzle guide may include the reciprocal groove, while the cover includes an inwardly-extending connector, such as a ridge. In this manner, the cover may securely connect to the nozzle guide without the use of separate and distinct fasteners or parts.

In at least one embodiment, the cover may include a safety-release groove formed on an outer surface. The safety-release groove is configured to allow a portion of the cover to break off when subjected to a substantial impact. As such, the safety-release groove allows a portion of the cover to absorb the impact and break free, so that the remainder of the MFI assembly is not damaged.

In at least one embodiment, the MFI assembly may also include a debris filter that is configured to allow over-pressurized fluid within an internal chamber of the MFI assembly to be released to the atmosphere, while at the same time preventing debris, such as dust, from passing into the internal chamber. For example, the debris filter may include or otherwise define a tortuous path that allows fluid under pressure to pass out to the atmosphere, while preventing debris from passing into the internal chamber.

In at least one embodiment, an MFI assembly may include a 3-way seal member that sealingly engages portions of a cover, a nozzle guide, and a fuel fill pipe. The same cover may be used to secure to different types of fuel fill pipes, such as metal fuel fill pipes and plastic fuel fill pipes.

An improper fuel nozzle insertion-inhibiting assembly, or MFI assembly, is described in PCT application WO 2014/133813, entitled "Improper Fuel Nozzle Insertion-Inhibiting Assembly," which was filed Feb. 17, 2014, and which claims priority to U.S. Provisional Application No. 61/770,112, which was filed Feb. 27, 2013. PCT application WO 2014/133813 is hereby incorporated by reference in its entirety.

Figure 1:
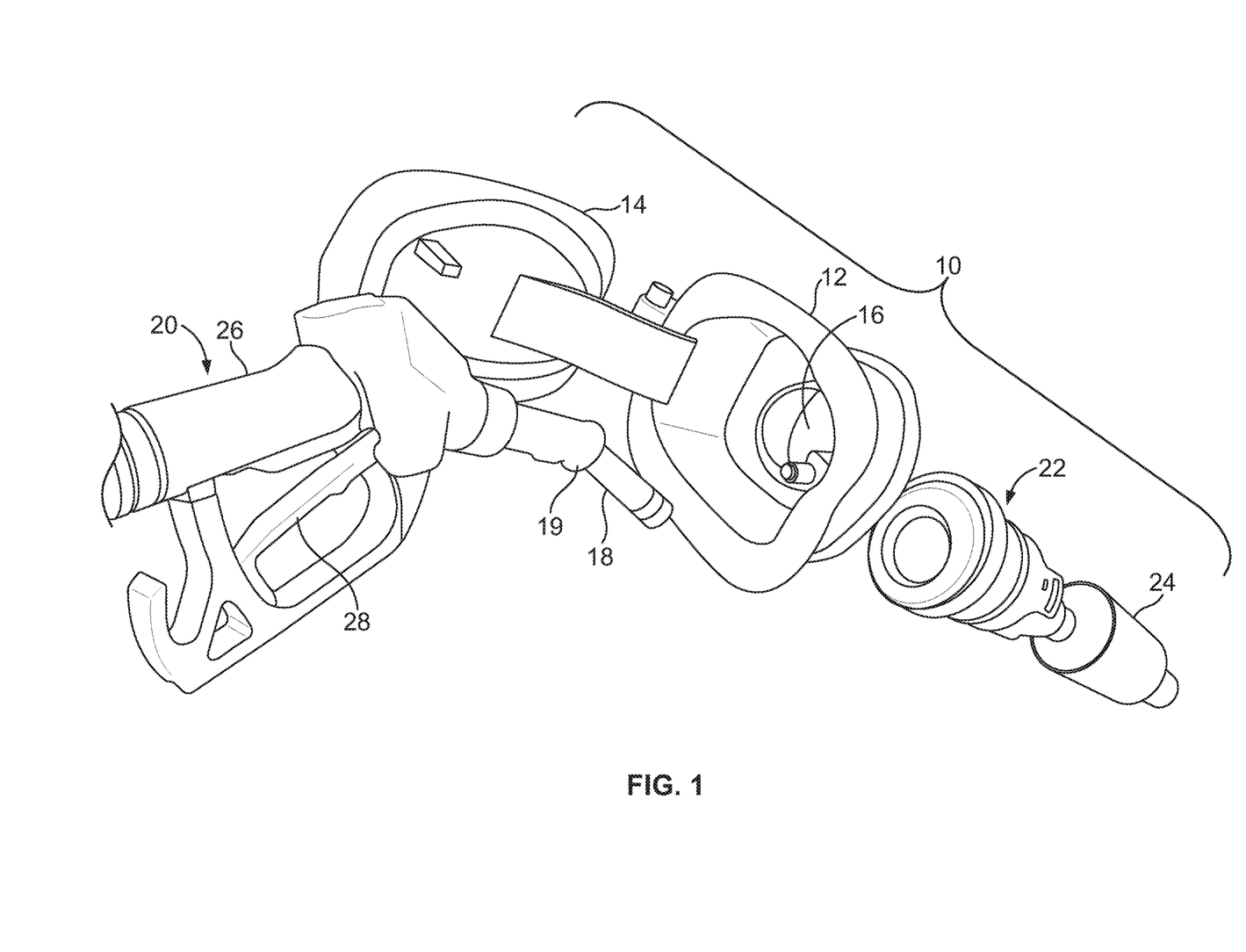
FIG. 1 illustrates a perspective view of a fuel intake system, according to an embodiment of the present disclosure.

FIG. 1 illustrates a perspective view of a fuel intake system 10, according to an embodiment of the present disclosure. The fuel intake system 10 may include a nozzle-receiving housing 12, which may be secured to a frame of a vehicle, for example. The nozzle-receiving housing 12 may include a door 14 that pivotally connects to the housing 12. The door 14 is configured to be pivoted between open and closed positions. The housing 12 defines an opening 16 into which a nozzle 18 of a fuel-dispensing device 20 may be inserted.

The housing 12 may directly or indirectly connect to an improper fuel nozzle insertion-inhibiting assembly, such as a mis-fuel inhibitor (MFI) assembly 22. The MFI assembly 22 is configured to prevent improper fuel-dispensing devices (for example, fuel-dispensing devices that are incompatible with the fuel intake system 10) from dispensing fuel into a fuel fill pipe 24 connected to the MFI assembly 22. For example, the MFI assembly 22 prevents a diesel fuel-dispensing device from being inserted into a gasoline fuel intake system, or vice versa. That is, a diesel fuel-dispensing device is an improper or incompatible fuel-dispensing device in relation to a gasoline fuel intake system, while a gasoline fuel-dispensing device is an improper or incompatible fuel-dispensing device in relation to a diesel fuel intake system.

The fuel-dispensing device 20 includes a handle 26 operatively connected to a trigger 28. The handle 26 is configured to be grasped by an operator and connects to the nozzle 18.

Figure 2:
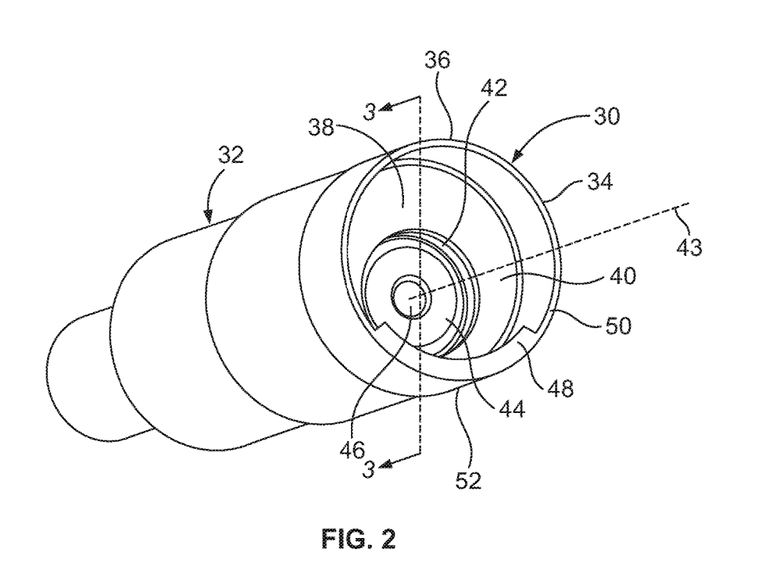
FIG. 2 illustrates a perspective front view of a mis-fuel inhibitor (MFI) assembly secured to a fuel fill pipe, according to an embodiment of the present disclosure.

FIG. 2 illustrates a perspective front view of a mis-fuel inhibitor (MFI) assembly 30 secured to a fuel fill pipe 32, according to an embodiment of the present disclosure. The MFI assembly 30 includes a cover 34 having a circumferential wall 36. The circumferential wall 36 may be circular in cross-section and connects to a front face wall 38 that may be generally perpendicular to the circumferential wall 36. For example, the front face wall 38 may form a base from which the circumferential wall 36 outwardly extends. An open nozzle-receiving cavity 40 is defined between the circumferential wall 36 and the front face wall 38. A channel 42 is formed through the front face wall 38. The channel 42 provides an inlet for a nozzle-receiving passage that extends through an internal chamber of the MFI assembly 30. A nozzle inlet barrier door 44 is pivotally secured within the channel 42. A pressure-relief valve 46 may be secured within the nozzle inlet barrier wall 44. Alternatively, the pressure-relief valve 46 may not be secured to the nozzle inlet barrier door 44. Instead, the nozzle inlet barrier door 44 may simply include a contiguous covering panel.

An arcuate nozzle-latching member 48, such as a ridge, rim, lip, or the like, may inwardly and radially extend from the circumferential wall 36 toward a central longitudinal axis 43 of the MFI assembly 30. The nozzle-latching member 48 may inwardly extend from a front edge 50 of the circumferential wall 36 and may generally conform to the curvature of the circumferential wall 36. The nozzle-latching member 48 may extend inwardly from a bottom 52 of the circumferential wall 36 over a radial angle of approximately 45°. Alternatively, the nozzle-latching member 48 may extend over distances that are greater or less than a radial angle of 45°. For example, the nozzle-latching member 48 may extend around an entire internal diameter of the circumferential wall 36. Additionally, the nozzle-latching member 48 may optionally be positioned further toward the front face wall 38, instead of the front edge 50. As shown in FIG. 2, however, the nozzle-latching member 48 is within the cavity 40 outside of the nozzle inlet barrier door 44.

Figure 3:
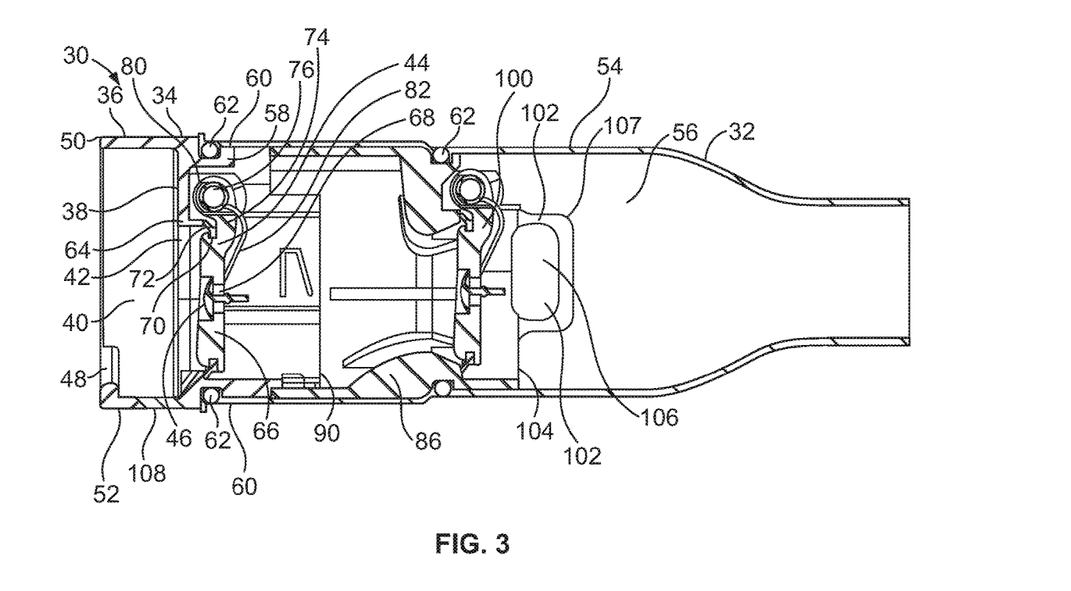
FIG. 3 illustrates an internal cross-sectional view of an MFI assembly secured to a fuel fill pipe through line 3-3 of FIG. 2, according to an embodiment of the present disclosure.

FIG. 3 illustrates an internal cross-sectional view of the MFI assembly 30 secured to the fuel fill pipe 32 through line 3-3 of FIG. 2, according to an embodiment of the present disclosure. The fuel fill pipe 32 may include an inlet pipe 54 defining an internal channel 56 that connects to a fuel tank (not shown).

The circumferential wall 36 of the MFI assembly 30 connects to a main body 58 or nozzle guide that is secured to the internal channel 56 of the inlet pipe 54. For example, the main body 58 may have an outer diameter that is less than that of the internal channel 56 of the inlet pipe 54, while the diameter of the circumferential wall 36 is greater than the diameter of the internal channel 56. As such, the main body 58 may be slid into the internal channel 56 until the circumferential wall 36 abuts against the inlet pipe 54. The main body 58 may securely connect to the inlet pipe 54 through an interference fit, for example.

The main body 58 may include a ledge 60 connected to the circumferential wall 36. The ledge 60 may retain a sealing member 62, such as an elastomeric gasket, O-ring, or the like, that provides a seal between the main body 58 and the inlet pipe 54.

As noted above, the nozzle inlet barrier door 44 is pivotally secured within the channel 42. The channel 42 is defined by an inwardly-directed tubular wall 64 that is generally perpendicular to the front face wall 38 and parallel with the circumferential wall 36.

The nozzle inlet barrier door 44 may include a covering panel 66 having a valve-retaining opening 68 formed therein. The valve-retaining opening 68 retains the pressure relief valve 46. When internal pressure exceeds a particular pre-defined threshold, the pressure-relief valve 46 may be forced open in relation to the valve-retaining opening 68, to allow fluid pressure to be released through the valve-retaining opening 68. When the pressure drops below the pre-defined threshold, the pressure relief valve 46 re-seats on the covering panel 66, thereby closing the valve-retaining opening 68.

The covering panel 66 may include a circumferential slot 70 that retains a radial seal 72 that outwardly and radially extends from the covering panel 66. In the closed position, the radial seal 72 sealingly engages the wall 64, thereby preventing fluid and debris, such as dust, from passing into an internal chamber 90 of the MFI assembly 30. Alternatively, instead of, or in addition to, the radial seal extending from the covering panel 66, a seal may radially extend inwardly from the wall 64 of the main body 58.

The nozzle inlet barrier door 44 also includes a hinge 74 that extends rearwardly from the covering panel 66. The hinge 74 includes integrally formed posts 76 that extend outwardly from an upper portion of the hinge 74. The posts 76 may define a pivot axle. For example, two opposed posts 76 may extend from an upper portion of the hinge 74. The posts 76 are pivotally secured within reciprocal post-receiving channels 80 of an axle bearing formed in the main body 58 behind the front face wall 38. As such, the nozzle inlet barrier door 44 pivotally connects to the main body 58 of the cover 34 without the use of separate and distinct pins, for example. In systems with pins, the additional component of the pin adds size. As such systems with pins are typically larger and bulkier than embodiments of the present disclosure. Further, the process of forming through-holes to accommodate and retain the pins, as well as ultrasonic welding of the holes, is labor and time-intensive, and therefore costly. Certain embodiments of the present disclosure provide assemblies that eliminate or otherwise reduce such costs.

One or more torsion springs 82 may be operatively connected to the hinge 74 and a rear surface of the covering panel 66. The torsion spring(s) 82 ensure that the nozzle inlet barrier door 44 remains in a closed position. The torsion spring(s) 82 resist force that tends to pivot the nozzle inlet barrier door 44 into an open position, such as a vacuum force produced within a fuel tank. Alternatively, the MFI assembly 30 may not include the torsion spring(s) 82. Instead, the nozzle inlet barrier door 44 may exert sufficient resistive force to ensure that the nozzle inlet barrier 44 remains closed.

The main body 58 may also include internal restricting members 86 downstream (in relation to a location where a fuel nozzle is inserted and urged into the MFI assembly 30) from the nozzle inlet barrier door 44. The restricting members 86 may be inwardly directed ribs, fins, panels, or the like that effectively reduce the internal diameter of the internal chamber 90 of the MFI assembly 30. For example, a diameter of a nozzle passage area within the internal chamber 90 proximate to the nozzle inlet barrier door 44 is greater than a diameter of a nozzle passage area within the internal chamber 90 proximate to a nozzle outlet barrier door 100. Thus, while a nozzle having a particular diameter may be able to pass into the internal chamber 90 through the nozzle inlet barrier door 44, the nozzle may have a diameter that is too large to pass between the restricting members 86. As such, the nozzle may be unable to abut against a front surface of the nozzle outlet barrier door 100.

The nozzle outlet barrier door 100 may be configured similar to the nozzle inlet barrier door 44. The nozzle outlet barrier door 100 may be pivotally secured to the main body 58 downstream from the restricting member 86.

The main body 58 may also include one or more snap rims 102 that extend longitudinally outward from a trailing edge 104 of the main body 58. Each snap rim 102 is configured to snapably engage a reciprocal latch 106 (such as a protuberance that conforms to a shape of an internal opening 107 formed within the snap rim 102) of the fuel fill pipe 32 that inwardly protrudes into the internal channel 56. In this manner, the snap rim(s) 102 securely connect the MFI assembly 30 to the fuel fill pipe 32.

As shown, an additional sealing member 62 may sealingly connect the main body 58 to the inlet pipe 54 proximate to the nozzle outlet barrier door 100. Alternatively, the MFI assembly 30 may include more or less sealing members 62 than shown.

The MFI assembly 30 may also include a drain 108 formed through the bottom 52 of the circumferential wall 36. The drain 108 may be an open-ended passage that allows fluid that collects within the open cavity 40 to drain out of the MFI assembly 30.

Figure 4:
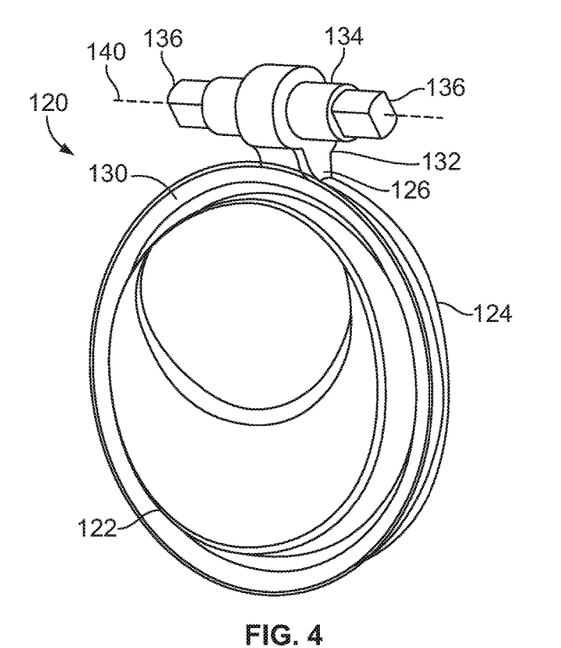
FIG. 4 illustrates a perspective front view of a nozzle barrier door, according to an embodiment of the present disclosure.

FIG. 4 illustrates a perspective front view of a nozzle barrier door 120, according to an embodiment of the present disclosure. The nozzle barrier door 120 may be used as a nozzle inlet barrier door, such as the nozzle inlet barrier door 44, or a nozzle outlet barrier door, such as the nozzle outlet barrier door 100, within an MFI assembly, such as the MFI assembly 30 shown and described with respect to FIGS. 2 and 3.

The nozzle barrier door 120 may include a covering panel 122. The covering panel 122 may include a valve-retaining opening that retains a pressure relief valve, as described above. Optionally, the covering panel 122 may not include a valve-retaining opening that retains a pressure relief valve.

A seal member 124 may radially extend around and/or from an outer circumferential edge of the covering panel 122. In the closed position, the seal member 124 sealingly engages a wall of the MFI assembly, thereby preventing fluid and debris, such as dust, from passing into an internal chamber of the MFI assembly. The seal member 124 may be a separate and distinct seal member that is secured to the covering panel 122. Optionally, the seal member 124 may be overmolded onto the covering panel 122.

The nozzle barrier door 120 also includes a hinge 126 that extends upwardly from a rear surface 128 of the covering panel 122. As shown, the seal member 124 may be disposed in front of the hinge 126. As such, the hinge 126 may be set back from a front surface 130 of the covering panel 122.

The hinge 126 may include a stud 132 that upwardly extends from the covering panel 122. The stud 132 connects to a crossbeam 134 that may generally be perpendicular to a longitudinal axis of the stud 132. Opposed posts 136 extend outwardly from opposite sends of the crossbeam 134. The posts 136 may define a pivot axle 140. The posts 136 are configured to be pivotally secured within reciprocal post-receiving channels of an axle bearing formed in a main body of an MFI assembly, as described above. Accordingly, the nozzle barrier door 120 pivotally connects to the main body of the MFI assembly without the use of separate and distinct pins, for example.

The nozzle barrier door 120, whether an inlet barrier door or an outlet barrier door, secures to an MFI assembly, such as a cover of the MFI assembly, without the use of separate and distinct pins. As such, through-holes are not formed through the MFI assembly. Because through-holes are not required to be formed through the MFI assembly, there is no need for ultrasonic welding, for example, or a separate flap bracket component to secure the nozzle barrier door 120 to the MFI assembly.

Figure 5:
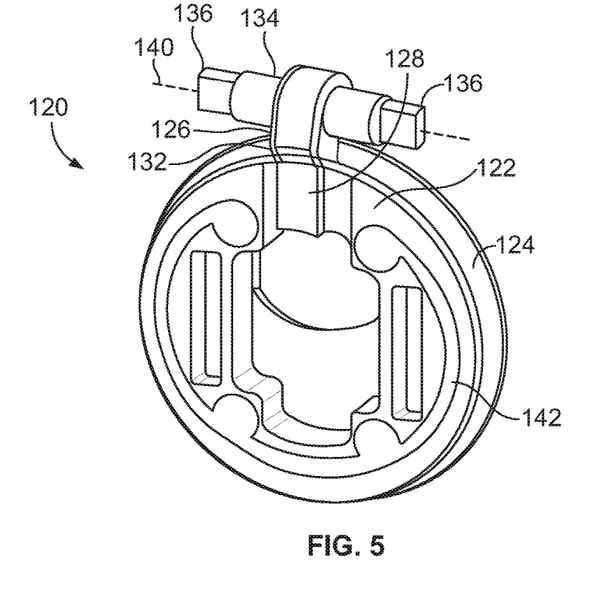
FIG. 5 illustrates a perspective rear view of a nozzle barrier door, according to an embodiment of the present disclosure.

FIG. 5 illustrates a perspective rear view of the nozzle barrier door 120. As shown in FIG. 5, the seal member 124 may be formed through the covering panel 122. For example, the seal member 124 may include an interior body 142 that is secured within an internal chamber of the covering panel 122. Outer edges of the seal member 124 may extend past the outer edges of the covering panel 122, thereby providing a seal member that radially extends past outer edges of the covering panel 122.

Figure 6:
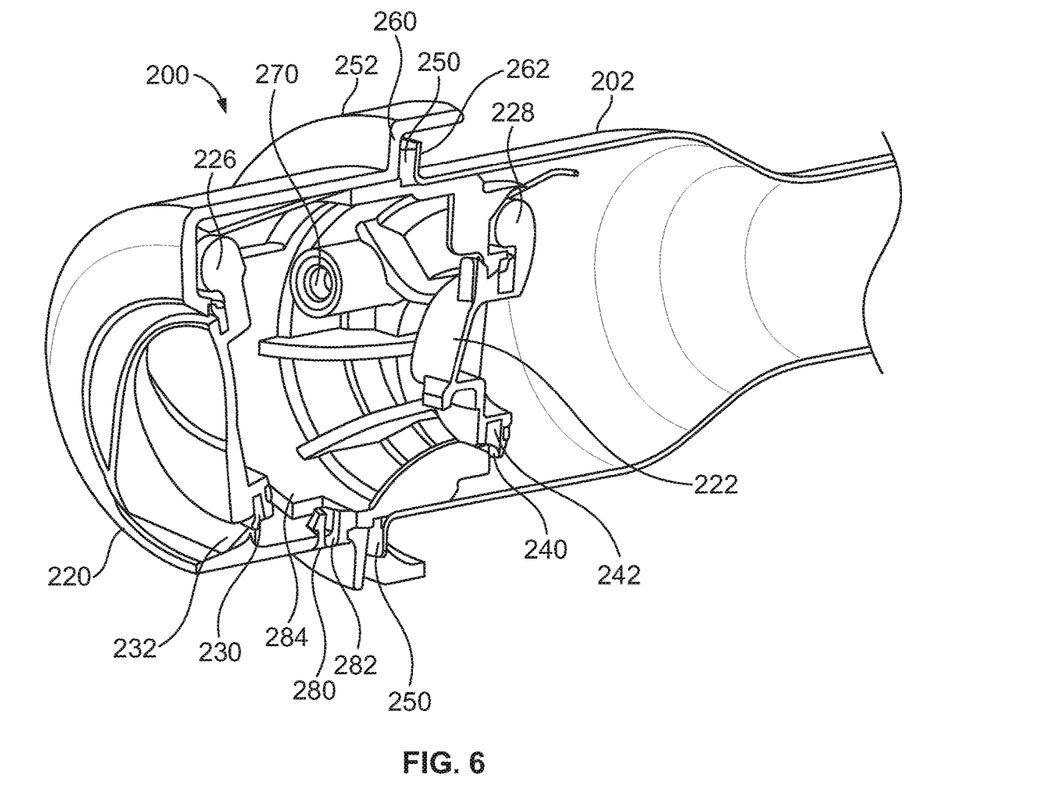
FIG. 6 illustrates a perspective internal view of an MFI assembly secured to a fuel fill pipe, according to an embodiment of the present disclosure.

FIG. 6 illustrates a perspective internal view of an MFI assembly 200 secured to a fuel fill pipe 202, according to an embodiment of the present disclosure. The MFI assembly 200 includes a nozzle inlet barrier door 220 and a nozzle outlet barrier door 222. Both the nozzle inlet barrier door 220 and the nozzle outlet barrier door 222 may be examples of nozzle barrier doors 120, as shown in FIGS. 4 and 5. Optionally, the nozzle inlet barrier doors 220 and 222 may be various other types of nozzle barrier doors that may be used in an MFI assembly.

The nozzle inlet barrier door 220 pivotally secures to the MFI assembly 200 through a hinge 226, as described above, without separate and distinct fasteners, such as pins. Similarly, the nozzle outlet barrier door 222 pivotally secures to the MFI assembly 200 through a hinge 228, as described above, without separate and distinct fasteners.

As shown, a seal member 230 of the nozzle inlet barrier door 220 sealingly engages a circumferential lip 232 that surrounds an inlet channel of the MFI assembly 200. When the nozzle inlet barrier door 220 is closed, as shown in FIG. 6, the sealing interface between the radial seal 230 and the circumferential lip 232 provides a sealed barrier that protects against dust infiltration, for example. Similarly, a seal member 240 of the nozzle outlet barrier door 222 sealingly engages a reciprocal portion of a main body or nozzle guide 242 of the MFI assembly 200.

As shown, a seal member, such as a pipe seal, 250 sealingly connects a cover 252 of the MFI assembly 200 to the fuel fill pipe 202. The pipe seal 250 may be compressively sandwiched between a bottom surface of a rim 260 of the cover 252, and an upper flange 262 of the fuel fill pipe 202. The pipe seal 250 may provide a 3-way sealing member that sealingly engages the cover 252 of the MFI assembly 200, the fuel fill pipe 202, and the main body 242, providing a robust and reliable seal that prevents moisture and debris from infiltrating into the MFI assembly 200 and the fuel fill pipe 202.

As shown in FIG. 6, the main body 242 may include a pressure relief valve 270, similar to those described above. Alternatively, the main body 242 may not include the pressure relief valve 270.

A debris filter 280 may be positioned within the cover 252. As shown, the debris filter 280 may be a separate and distinct component that secures within a reciprocal opening formed in the cover 252. Alternatively, the debris filter 280 may be integrally molded and formed with the cover 252. Also, alternatively, the debris filter 280 may be formed through a portion of the main body 242.

The debris filter 280 may include a passage 282 that extends through the cover 252 and into an internal chamber 284 of the MFI assembly 200. A filtering medium may be positioned within the passage 282. For example, a porous membrane that is configured to allow certain fluids to pass, but block other fluids or materials, may be positioned within the passage 282. Accordingly, the debris filter 280 is configured to allow air within the internal chamber 284 to pass through the filter 280 and out of the MFI assembly 200. The debris filter 280 prevents debris, such as dust, from passing through the debris filter 280 and into the internal chamber 284. Optionally, instead of a separate and distinct filtering medium, the debris filter 280 may allow air to pass out of the MFI assembly 200 and prevent debris from passing therein through a tortuous path.

Figure 7:
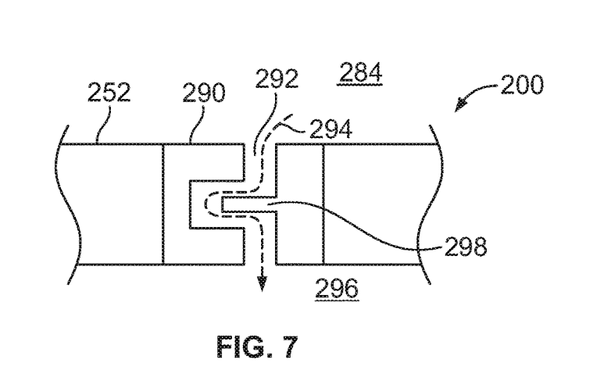
FIG. 7 illustrates a simplified cross-sectional view of a debris filter secured within a cover of an MFI assembly, according to an embodiment of the present disclosure.

FIG. 7 illustrates a simplified cross-sectional view of the debris filter 280 secured within the cover 252 of the MFI assembly 200, according to an embodiment of the present disclosure. As shown, the debris filter 280 includes a body 290 that defines a tortuous path 292 having twists, turns, bends, or the like. If fluid pressure builds within the internal chamber 284 of the MFI assembly 200, the internal pressure may force the fluid 294 through the tortuous path 292 and out to atmosphere 296. Conversely, any debris, such as dust, outside of the debris filter 280 that enters the tortuous path 292 abuts into an internal wall 298 of the debris filter 280 and collects thereon, instead of passing into the internal chamber 284. That is, the internal walls of the body 290 of the debris filter 280 define the tortuous path 292 and provide barriers on which the debris may settle, but through which the debris is unable to pass.

The tortuous path 292 may include more or less twists and turns than shown. Further, tortuous path 292 may include walls that define curved passages. For example, the tortuous path 292 may be defined by curved walls that define a serpentine path.

Referring to FIGS. 6 and 7, the MFI assembly 200 may include more than one debris filter. For example, a plurality of debris filters may be disposed around a circumferential wall of a cover of the MFI assembly 200. Alternatively, the MFI assembly 200 may not include any debris filters.

The debris filter 280 shown and described with respect to FIGS. 6 and 7 may be used with any of the embodiments described in the present application.

Figure 8:
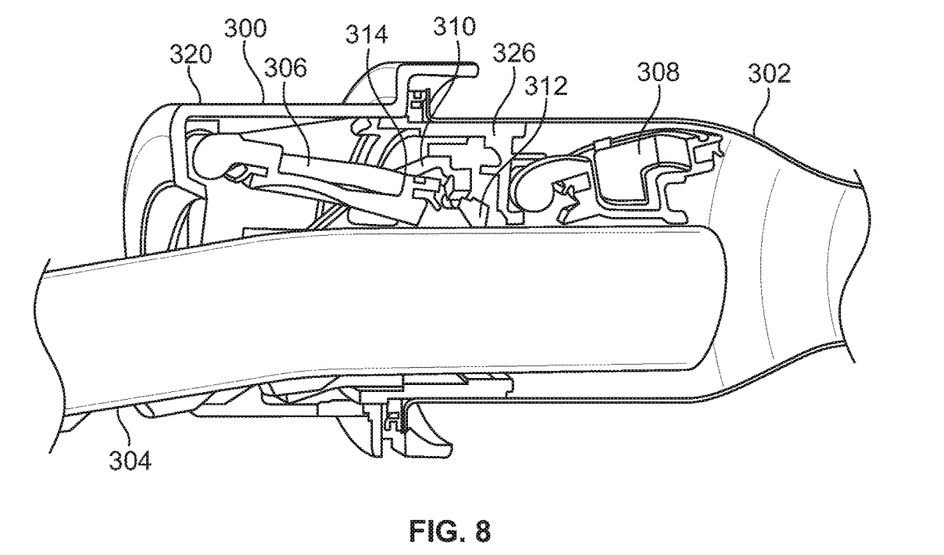
FIG. 8 illustrates a perspective internal view of an MFI assembly secured to a fuel fill pipe having a fuel nozzle inserted therein, according to an embodiment of the present disclosure.

FIG. 8 illustrates a perspective internal view of an MFI assembly 300 secured to a fuel fill pipe 302 having a fuel nozzle 304 inserted therein, according to an embodiment of the present disclosure. As shown, as the fuel nozzle 304 is inserted into the MFI assembly 300, a nozzle inlet barrier door 306 and a nozzle outlet barrier door 308 pivot open. In order to prevent the nozzle inlet barrier door 306 from over-pivoting (to a point at which it could fall out of pivotal engagement with the MFI assembly 300), a pivot-restricting member 310 may be formed within the internal chamber 312. The pivot-restricting member 310 may be a separate and distinct piece secured within the internal chamber 312. Optionally, the pivot-restricting member 310 may be integrally molded and formed with the MFI assembly 200.

The pivot-restricting member 310 may be a stud, latch, beam, block, nub, rib, fin, or the like that is configured to contact a bottom portion 314, such as a bottom half, edge, or the like, of the nozzle inlet barrier door 306 when the nozzle inlet barrier door 306 is opened. The pivot-restricting member 310 provides a hard stop barrier past which the pivot-restricting member 310 cannot pass. Accordingly, the pivot-restricting member 310 prevents the nozzle inlet barrier door 306 from over-pivoting.

In at least one embodiment, the pivot-restricting member 310 may be formed on a ring that is secured within a main body of the MFI assembly 300, for example. In another embodiment, the pivot-restricting member 310 may be formed on a collar defining an internal channel that is positioned within the internal chamber 312. In another embodiment, the pivot-restricting member 310 may be an integrally formed and molded portion of the main body of the MFI assembly 300.

While not shown, a pivot-restricting member may also be positioned in relation to the nozzle outlet barrier door 308. As such, a pivot-restricting member may be configured to prevent the nozzle outlet barrier door 308 from over-pivoting.

The pivot-restricting member shown and described with respect to FIG. 8 may be used with any of the embodiments described in the present application.

Figure 9:
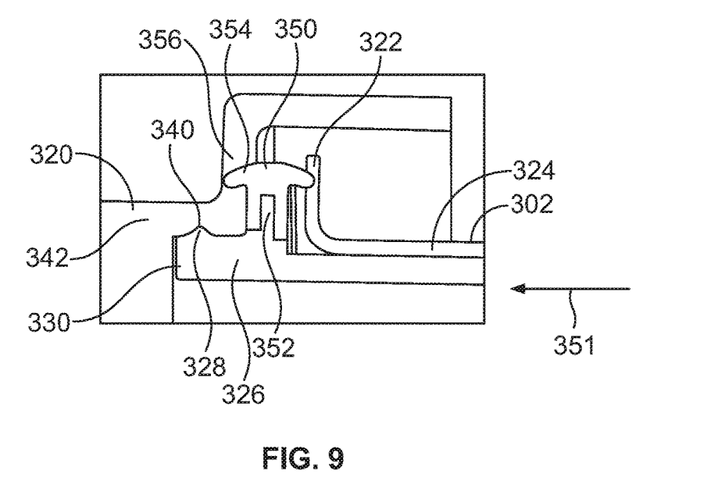
FIG. 9 illustrates a cross-sectional view of a fuel fill pipe secured to a cover of an MFI assembly, according to an embodiment of the present disclosure.

FIG. 9 illustrates a cross-sectional view of the fuel fill pipe 302 secured to a cover 320 of the MFI assembly 300, according to an embodiment of the present disclosure. Referring to FIGS. 8 and 9, the fuel fill pipe 302 may include an outer flange 322 that connects to an internal pipe body 324. A portion of a main body or main body 326 of the MFI assembly 300 is positioned within the fuel fill pipe 302. In order to securely connect the main body 326, or at least one portion of the MFI assembly 300, to the cover 320, the main body 326 may include an annular connector 328 that outwardly extends from a shaft of the main body 326 at a proximal end 330. The connector 328 may be or include an annular rim, ridge, or the like. As shown in FIG. 9, the connector 328 may include a triangular cross-section and/or profile. The connector 328 is securely retained within a reciprocal groove 340 formed within an interior wall 342 of the cover 320. For example, the connector 328 may be snapably secured within the reciprocal groove 340.

In at least one embodiment, the connector 328 may secure to the reciprocal groove 340 through a tight, radial interference fit. Alternatively, or additionally, the connector 328 may provide a bump-off that snapably secures into the reciprocal groove 340. The bump-off provides a small undercut or feature that may be removed from a straight-pull mold without the use of a side action force.

As the main body 326 is inserted into the cover 320 in the direction of arrow 351, the connector 328 may force the interior wall 342 of the cover to slightly deflect outward. Once the connector 328 reaches the groove 340, the interior wall 342 deflects back to its at-rest position (shown in FIG. 9), such that the connector 328 is retained within the groove 340. In this manner, the cover 320 securely connects to the main body 326.

The connector 328 and the reciprocal groove 340 shown and described with respect to FIG. 9 may be used with any of the embodiments described in the present application.

A seal member, such as a pipe seal, 350 may also secure over a ridge 352 that extends outwardly from the main body 326. The pipe seal 350 may be a contiguous ring that wraps around the ridge 352. The pipe seal 350 includes a head 354 that sealingly engages an interior wall portion 356 of the cover and the outer flange 322 of the of the fuel fill pipe 302. Accordingly, the pipe seal 350 provides a seal member that sealingly engages three separate and distinct components: the fuel fill pipe 302, the cover 320, and the main body 326. In this manner, the pipe seal 350 provides a 3-way seal member.

The pipe seal 350 may be used with any of the embodiments described in the present application.

Figure 10:
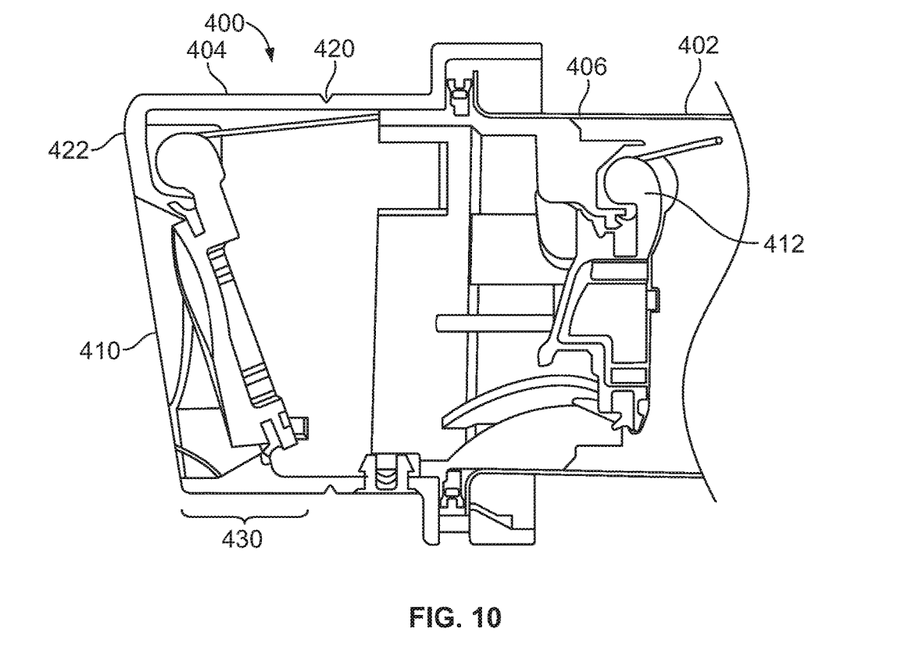
FIG. 10 illustrates a cross-sectional view of an MFI assembly secured to a fuel fill pipe, according to an embodiment of the present disclosure.

FIG. 10 illustrates a cross-sectional view of an MFI assembly 400 secured to a fuel fill pipe 402, according to an embodiment of the present disclosure. The MFI assembly 400 is similar to those described above and may include a cover 404 connected to a main body 406 that fits within a portion of the fuel fill pipe 402. A nozzle inlet barrier door 410 and a nozzle outlet barrier door 412 are pivotally secured to the MFI assembly 400.

A safety-release groove 420 may be formed through an outer surface of the cover 404. The safety-release groove 420 may be a contiguous groove formed around a circumference of the cover 404. Alternatively, the safety-release groove 420 may include a plurality of indentations, perforations, weakened areas, or the like around the circumference of the cover 404. As shown, the safety-release groove 420 may be upstream from the main body 406. That is, the safety-release groove 420 may be located on an outer portion of the cover 404 toward a proximal end 422 of the cover 404 and offset from the main body 406.

In operation, if the MFI assembly 400 is subject to a substantial impact, the safety-release groove 420 fully cracks, so that a proximal portion 430 of the cover 404 breaks off from the remainder that is secured to the fuel fill pipe 402. The safety-release groove 420 may be configured to crack open when subjected to a force that meets or exceeds a particular magnitude. The safety-release groove 420 allows a portion of the MFI assembly 400 to separate therefrom upon exertion of a sufficient force. In this manner, the remaining portion of the MFI assembly 400, such as the main body 406, remains secured to the fuel fill pipe 402 without being damaged or damaging the fuel fill pipe 402 due to the impact, as the brunt of the impact is absorbed by the proximal portion 430 that breaks off.

The safety-release groove 420 may be used with any of the embodiments described in the present application.

Figure 11:
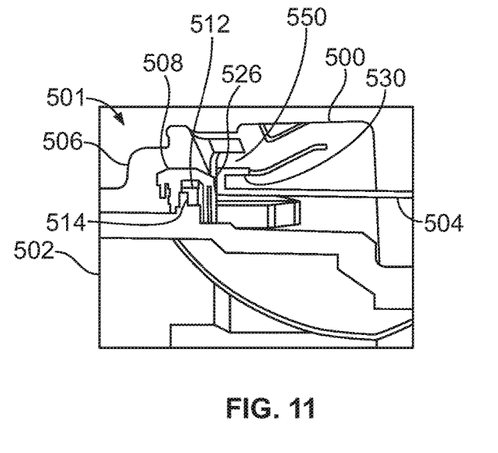
FIG. 11 illustrates a cross-sectional view of a cover of an MFI assembly securing to a main body and a metal fuel fill pipe, according to an embodiment of the present disclosure.

FIG. 11 illustrates a cross-sectional view of a cover 500 of an MFI assembly 501 securing to a main body 502 and a metal fuel fill pipe 504, according to an embodiment of the present disclosure. As shown, the cover 500 includes cover body 506 that defines a seal channel 508. A seal member 510, such as a pipe seal, is securely retained within the seal channel 508. The seal member 510 may be a 3-way seal that sealingly engages the cover 500, the main body 502, and the metal fuel fill pipe 504. The seal member 520 may include a guide channel 512 that sealingly latches to an annular ridge, tab, or the like 514 formed around a portion of the main body 502. Accordingly, the seal member 520 sealingly engages both an internal surface of the cover 500 and an outer portion of the main body 502. At the same time, a bottom portion of the seal member 520 abuts into a proximal end 526 of the metal fuel fill pipe 504. In this manner, the seal 520 sealingly engages portions of the cover 500, the main body 502, and the fuel fill pipe 504, providing a 3-way sealing interface.

As shown, an outer collar 530 of the metal fuel fill pipe 504 may be securely retained (such as through an interference fit, a snapable connection, and/or the like) within a retaining channel 550 of the cover 500. The outer collar 530 is trapped within the retaining channel 550, thereby securely connecting the metal fuel fill pipe 504 to the cover 500. For example, the outer collar 530 may be configured to be snapably secured within the retaining channel 550. Additionally, the same cover 500 may be configured to securely connect to a plastic fuel fill pipe.

Figure 12:
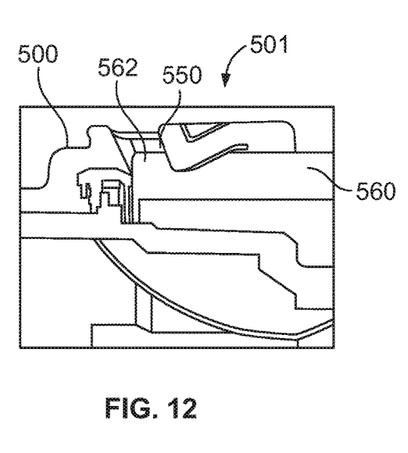
FIG. 12 illustrates a cross-sectional view of a cover of an MFI assembly secured to a main body and a plastic fuel fill pipe, according to an embodiment of the present disclosure.

FIG. 12 illustrates a cross-sectional view of the cover 500 of the MFI assembly 501 secured to the main body 502 and a plastic fuel fill pipe 560, according to an embodiment of the present disclosure. As shown, the retaining channel 550 is sized and shaped to securely retain a proximal flange 562 of the plastic fuel fill pipe 560. Accordingly, the retaining channel 550 is sized and shaped to securely retain the outer collar 530 of the metal fuel fill pipe 504 and the proximal flange 562 of the plastic fuel fill pipe 560. In this manner, the same cover 500 may be used to connect to the metal fuel fill pipe 504 or the plastic fuel fill pipe 560 without any extra parts, fasteners, or the like.

The seal member 510 and/or the cover 500 may be used with any of the embodiments of the present disclosure.

Figure 13:
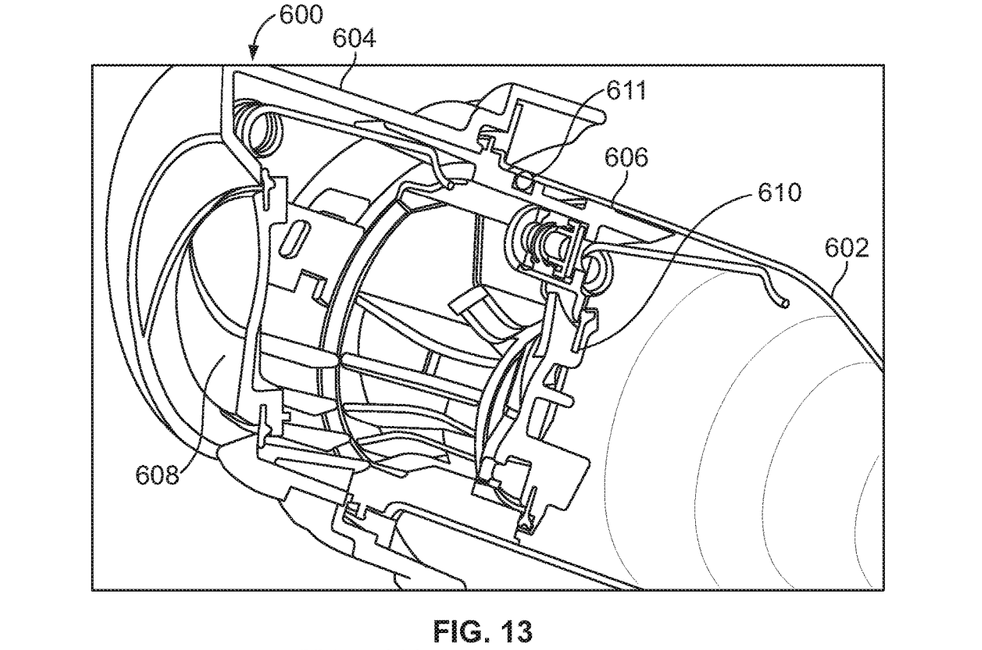
FIG. 13 illustrates a perspective internal view of an MFI assembly secured to a fuel fill pipe from an outer end, according to an embodiment of the present disclosure.
Figure 14:
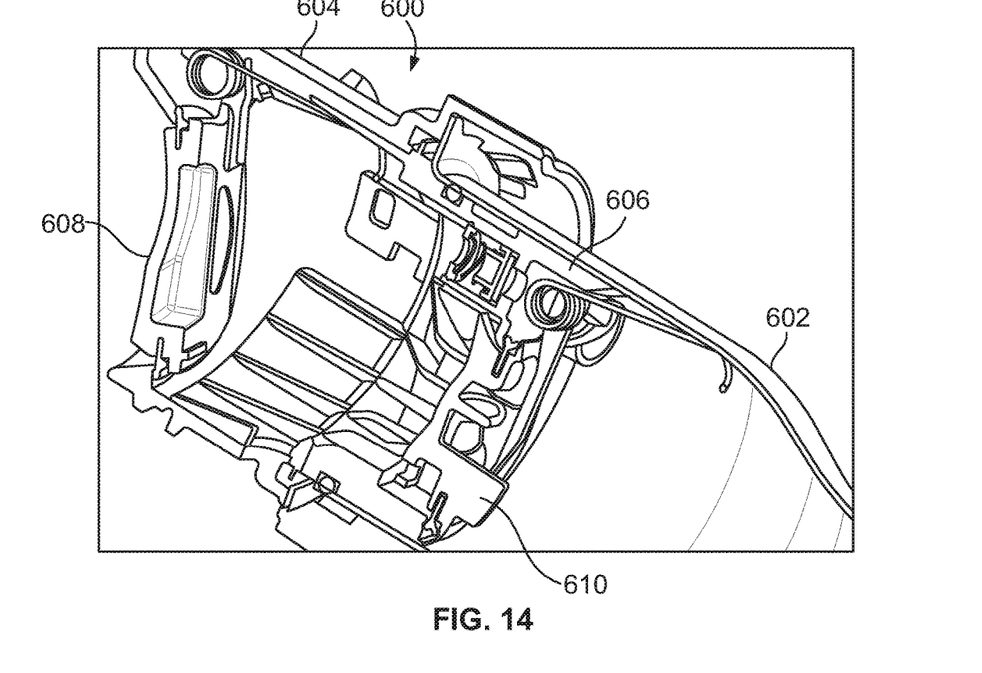
FIG. 14 illustrates a perspective internal view of an MFI assembly secured to a fuel fill pipe from an inner end, according to an embodiment of the present disclosure.

FIG. 13 illustrates a perspective internal view of an MFI assembly 600 secured to a fuel fill pipe 602 from an outer end, according to an embodiment of the present disclosure. FIG. 14 illustrates a perspective internal view of the MFI assembly 600 secured to the fuel fill pipe 602 from an inner end. Referring to FIGS. 13 and 14, the MFI assembly 600 includes a cover 604 secured to a main body or nozzle guide 606, as described above. A nozzle inlet barrier door 608 and a nozzle outlet barrier door 610 may be pivotally secured to the MFI assembly 600. A seal member 611 may extend around a portion of the main body 606 and may provide a sealing interface between the main body 606 and an internal wall portion of the fuel fill pipe 602.

Referring to FIG. 1-14, embodiments of the present disclosure provide an MFI assembly that may include one or more nozzle barrier doors. The MFI assembly may include one or more pivot-restricting members that are configured to provide positive stops that prevent the one or more nozzle barrier doors from being over-pivoted.

Embodiments of the present disclosure provide an MFI assembly that may include a cover that securely connects to a nozzle guide, such as through snapable engagement. For example, the nozzle guide may include a connector, such an annular ridge, which snapably secures to a reciprocal groove formed in the cover. Alternatively, the nozzle guide may include the reciprocal groove, while the cover includes an inwardly-extending connector, such as a ridge.

The cover may include a safety-release groove formed on an outer surface. The safety-release groove is configured to allow a portion of the cover to break off when subjected to a substantial impact. As such, the safety-release groove allows a portion of the cover to absorb the impact and break free, so that the remainder of the MFI assembly is not damaged.

The MFI assembly may also include a debris filter that is configured to allow over-pressurized fluid within an internal chamber of the MFI assembly to be released to the atmosphere, while at the same time preventing debris, such as dust, from passing into the internal chamber. In at least one embodiment, the debris filter includes a tortuous path that allows fluid under pressure to pass out to the atmosphere, while preventing debris from passing into the internal chamber.

Embodiments of the present disclosure provide an MFI assembly that may include a 3-way seal member that sealingly engages portions of a cover, a nozzle guide, and a fuel fill pipe. The same cover may be used to secure to different types of fuel fill pipes, such as metal fuel fill pipes and plastic fuel fill pipes.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. An improper fuel nozzle insertion-inhibiting assembly configured to prevent an improper fuel-dispensing device from dispensing fuel into a fuel fill line of a vehicle, the improper fuel nozzle insertion-inhibiting assembly comprising:
   a cover including a pinless nozzle inlet barrier door pivotally secured to the cover, and a safety-release groove that is configured to separate the cover into separate pieces upon exertion of sufficient force, wherein the pinless nozzle inlet barrier door includes an integral first seal;
   a main body secured to the cover and configured to connect to a fuel fill pipe, wherein the main body includes a pinless nozzle outlet barrier door pivotally secured to the main body, wherein the pinless nozzle outlet barrier door includes an integral second seal, wherein at least a first portion of the main body securely connects to at least a second portion the cover;
   a debris filter secured to and disposed within and around a circumferential wall of one or both of the cover and the main body, wherein the debris filter is configured to prevent debris from passing into an internal chamber defined by one or both of the cover and the main body;
   at least one pivot-restricting member secured within and extending into the internal chamber, wherein the at least one pivot-restricting member is configured to prevent one or both of the nozzle inlet barrier door and the nozzle outlet barrier door from over-pivoting; and
   a seal member that is configured to sealingly engage at least portions of the fuel fill pipe, the cover, and the main body.

2. The improper fuel nozzle insertion-inhibiting assembly of claim 1, wherein the debris filter comprises a tortuous path that is configured to allow pressurized fluid within the internal chamber to pass out of the internal chamber, and wherein the tortuous path is configured to prevent the debris from passing into the internal chamber.

3. The improper fuel nozzle insertion-inhibiting assembly of claim 1, wherein the at least one pivot-restricting member comprises one or more of a stud, latch, beam, block, or rib extending into the internal chamber.

4. The improper fuel nozzle insertion-inhibiting assembly of claim 1, wherein the at least a first portion of the main body comprises an outwardly-extending annular connector, and wherein the at least a second portion of the cover comprises a circumferential groove formed on an inner wall, and wherein the circumferential groove snapably retains the annular connector.

5. The improper fuel nozzle insertion-inhibiting assembly of claim 1, wherein the safety-release groove extends around a circumference of an outer surface of the cover.

6. The improper fuel nozzle insertion-inhibiting assembly of claim 1, wherein the cover securely connects to the fuel fill pipe and at least one other fuel fill pipe formed of a different material and having a different shape than the fuel fill pipe.

7. An improper fuel nozzle insertion-inhibiting assembly configured to prevent an improper fuel-dispensing device from dispensing fuel into a fuel fill line of a vehicle, the improper fuel nozzle insertion-inhibiting assembly comprising:
   a cover including a nozzle inlet barrier door pivotally secured to the cover, wherein the cover includes a safety-release groove that is configured to separate the cover into separate pieces upon exertion of sufficient force;
   a main body secured to the cover and configured to connect to a fuel fill pipe, wherein the main body includes a nozzle outlet barrier door pivotally secured to the main body; and
   a debris filter secured to and disposed within and around a circumferential wall of one or both of the cover and the main body, wherein the debris filter is configured to prevent debris from passing into an internal chamber defined by one or both of the cover and the main body.

8. The improper fuel nozzle insertion-inhibiting assembly of claim 7, wherein the debris filter comprises a tortuous path that is configured to allow pressurized fluid within the internal chamber to pass out of the internal chamber, and wherein the tortuous path is configured to prevent the debris from passing into the internal chamber.

9. The improper fuel nozzle insertion-inhibiting assembly of claim 7, further comprising at least one pivot-restricting member secured within and extending into the internal chamber, wherein the at least one pivot-restricting member is configured to prevent one or both of the nozzle inlet barrier door and the nozzle outlet barrier door from over-pivoting.

10. The improper fuel nozzle insertion-inhibiting assembly of claim 9, wherein the at least one pivot-restricting member comprises one or more of a stud, latch, beam, block, or rib extending into the internal chamber.

11. The improper fuel nozzle insertion-inhibiting assembly of claim 7, further comprising at least one seal member that is configured to sealingly engage at least portions of the fuel fill pipe, the cover, and the main body.

12. The improper fuel nozzle insertion-inhibiting assembly of claim 7, wherein the main body comprises an outwardly-extending annular connector, and wherein the cover comprises a circumferential groove formed on an inner wall, and wherein the circumferential groove snapably retains the annular connector.

13. The improper fuel nozzle insertion-inhibiting assembly of claim 7, wherein the safety-release groove extends around a circumference of an outer surface of the cover.

14. The improper fuel nozzle insertion-inhibiting assembly of claim 7, wherein the cover securely connects to the fuel fill pipe and at least one other fuel fill pipe formed of a different material and having a different shape than the fuel fill pipe.

15. The improper fuel nozzle insertion-inhibiting assembly of claim 7, wherein the debris filter includes a passage that extends through the cover and into the internal chamber, wherein a filtering medium is positioned within the passage.

16. An improper fuel nozzle insertion-inhibiting assembly configured to prevent an improper fuel-dispensing device from dispensing fuel into a fuel fill line of a vehicle, the improper fuel nozzle insertion-inhibiting assembly comprising:
   a cover including a nozzle inlet barrier door pivotally secured to the cover;
   a main body secured to the cover and configured to connect to a fuel fill pipe, wherein the main body includes a nozzle outlet barrier door pivotally secured to the main body; and
   a debris filter secured to and disposed within and around a circumferential wall of one or both of the cover and the main body, wherein the debris filter is configured to prevent debris from passing into an internal chamber defined by one or both of the cover and the main body.

17. The improper fuel nozzle insertion-inhibiting assembly of claim 16, wherein the debris filter comprises a tortuous path that is configured to allow pressurized fluid within the internal chamber to pass out of the internal chamber, and wherein the tortuous path is configured to prevent the debris from passing into the internal chamber.

18. The improper fuel nozzle insertion-inhibiting assembly of claim 16, further comprising at least one pivot-restricting member secured within and extending into the internal chamber, wherein the at least one pivot-restricting member is configured to prevent one or both of the nozzle inlet barrier door and the nozzle outlet barrier door from over-pivoting.

19. The improper fuel nozzle insertion-inhibiting assembly of claim 16, further comprising at least one seal member that is configured to sealingly engage at least portions of the fuel fill pipe, the cover, and the main body.

20. The improper fuel nozzle insertion-inhibiting assembly of claim 16, wherein the main body comprises an outwardly-extending annular connector, and wherein the cover comprises a circumferential groove formed on an inner wall, and wherein the circumferential groove snapably retains the annular connector.

\* \* \* \* \*